(12) United States Patent
Tonegawa

(10) Patent No.: US 10,250,391 B2
(45) Date of Patent: Apr. 2, 2019

(54) COMMUNICATION APPARATUS, METHOD OF CONTROLLING THE SAME, AND STORAGE MEDIUM

(71) Applicant: CANON KABUSHIKI KAISHA, Tokyo (JP)

(72) Inventor: Nobuyuki Tonegawa, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 94 days.

(21) Appl. No.: 14/688,147

(22) Filed: Apr. 16, 2015

(65) Prior Publication Data

US 2015/0312044 A1    Oct. 29, 2015

(30) Foreign Application Priority Data

Apr. 25, 2014  (JP) ................. 2014-091997

(51) Int. Cl.
*H04L 9/32* (2006.01)
*H04L 12/58* (2006.01)

(52) U.S. Cl.
CPC ............ *H04L 9/3247* (2013.01); *H04L 51/08* (2013.01); *H04L 51/30* (2013.01)

(58) Field of Classification Search
CPC ............................................. H04N 1/00209
See application file for complete search history.

(56) References Cited

U.S. PATENT DOCUMENTS

| | | | |
|---|---|---|---|
| 5,905,783 A * | 5/1999 | Tonegawa ......... | H04N 1/00204 358/400 |
| 6,952,721 B2 | 10/2005 | Tonegawa ................... | 709/206 |
| 7,394,560 B2 | 7/2008 | Tonegawa ................... | 358/1.15 |
| 8,244,813 B2 * | 8/2012 | Kasatani ................ | H04L 51/18 379/100.08 |
| 8,676,898 B2 | 3/2014 | Tonegawa ..................... | 709/206 |
| 8,817,308 B2 | 8/2014 | Tonegawa .................... | 358/1.15 |
| 2002/0046404 A1 * | 4/2002 | Mizutani ............. | G11B 27/002 725/58 |
| 2002/0114016 A1 * | 8/2002 | Tsuchiya ........... | H04N 1/00209 358/402 |
| 2004/0205330 A1 * | 10/2004 | Godfrey ............... | G06Q 10/107 713/150 |
| 2006/0017965 A1 | 1/2006 | Tonegawa .................... | 358/1.15 |
| 2006/0050303 A1 | 3/2006 | Oomori ....................... | 358/1.15 |

(Continued)

FOREIGN PATENT DOCUMENTS

| | | | | |
|---|---|---|---|---|
| JP | A 2004-297767 | 10/2004 | ............ | G06F 13/00 |
| JP | A 2005-159726 | 6/2005 | | |

(Continued)

OTHER PUBLICATIONS

Japanese Office Action dated Feb. 5, 2018, in related Japanese Patent Application No. 2014-091997.

*Primary Examiner* — Joseph P Hirl
*Assistant Examiner* — Sayed Aresh Beheshti Shirazi
(74) *Attorney, Agent, or Firm* — Venable LLP

(57) ABSTRACT

A transmitting side communication apparatus reads an image from an original, adds, in a case where an IFAX mode is selected, signature information related to a user and signature information related to the apparatus to an electronic mail, and adds, in a case where an electronic mail mode is selected, signature information related to the user to the electronic mail.

10 Claims, 13 Drawing Sheets

(56) References Cited

U.S. PATENT DOCUMENTS

| | | | |
|---|---|---|---|
| 2006/0192990 A1* | 8/2006 | Tonegawa | H04N 1/00209 358/1.15 |
| 2006/0270445 A1* | 11/2006 | Miramontes | H04M 1/0208 455/550.1 |
| 2007/0076240 A1* | 4/2007 | Ogura | G06F 21/6209 358/1.14 |
| 2010/0171985 A1 | 7/2010 | Tonegawa | 358/1.15 |
| 2012/0274988 A1* | 11/2012 | Bloomfield | H04L 51/066 358/402 |
| 2014/0161255 A1 | 6/2014 | Tonegawa | 380/246 |
| 2014/0289532 A1* | 9/2014 | Kako | H04L 9/3247 713/176 |

FOREIGN PATENT DOCUMENTS

| | | |
|---|---|---|
| JP | 2007-043413 A | 2/2007 |
| JP | A 2007-026173 | 2/2007 |
| JP | 2007-094541 A | 4/2007 |
| JP | 2008-124821 A | 5/2008 |
| JP | 2010-239444 A | 10/2010 |

\* cited by examiner

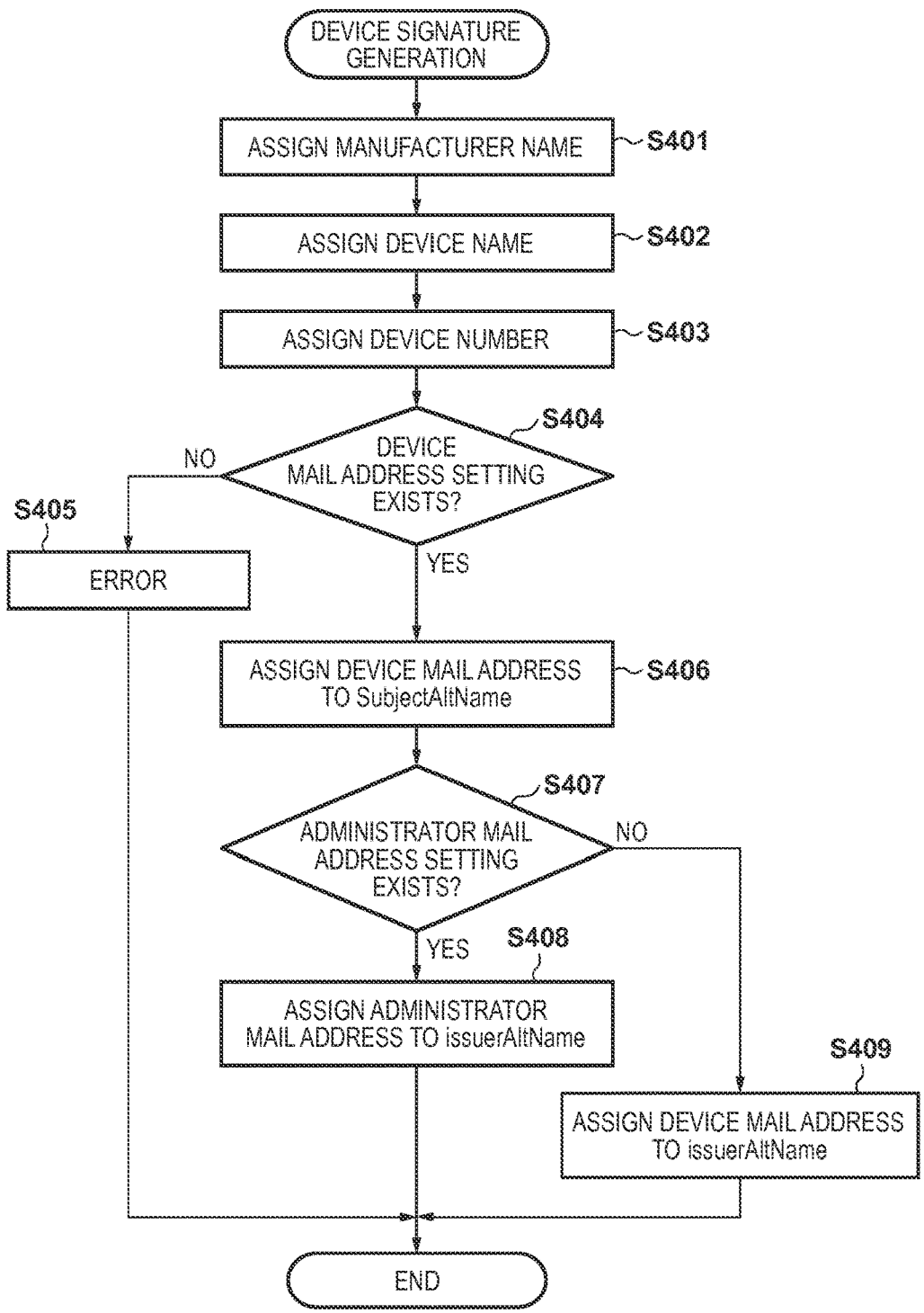

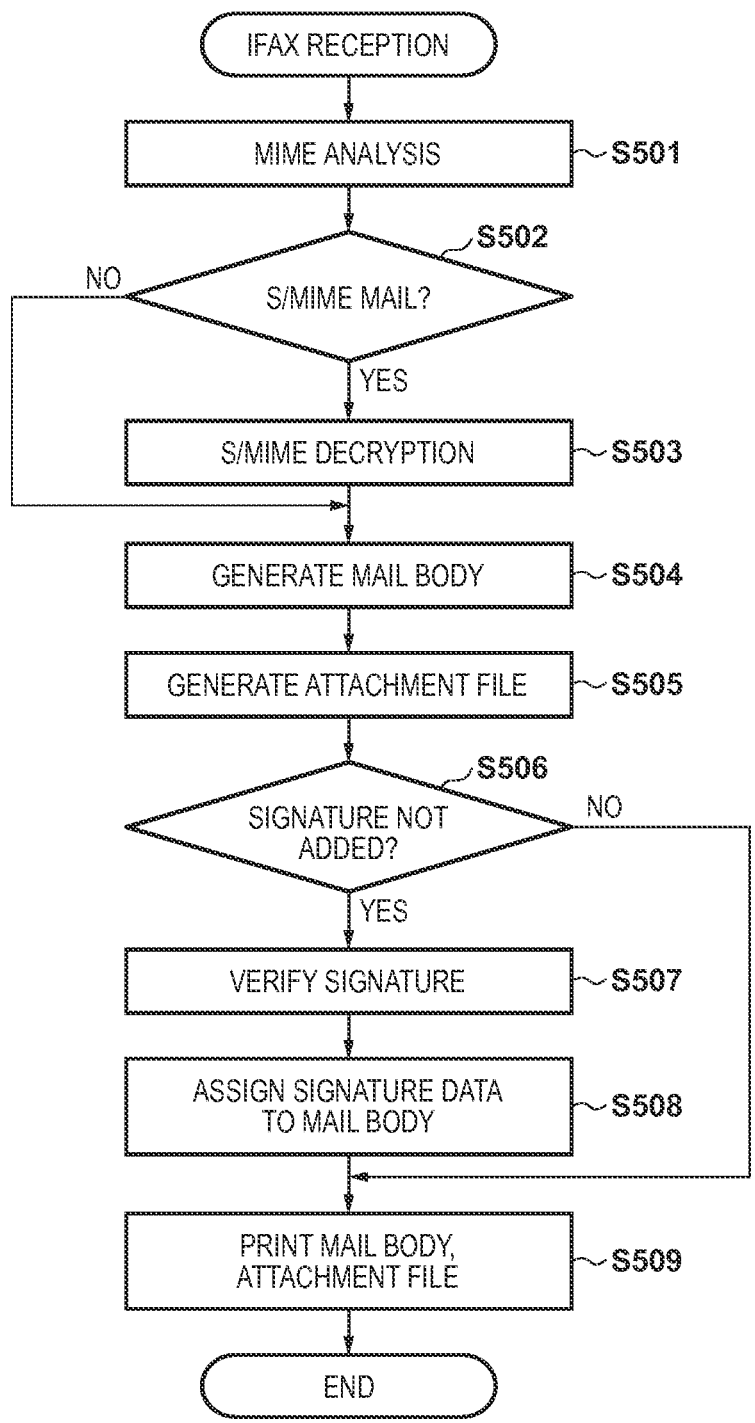

FIG. 8

600
- From: ifax@abc.co.jp
- To: ifax@xyz.co.jp
- Subject: smime-mail
- Date:Sat, 29 May 2010 13:21:23 +0900
- Message-Id: <20100529132118.BED2.1342DF07@abc.co.jp>

601
- TO ZYZ INCORPORATED,

- THANK YOU FOR YOUR TROUBLE.
- SENT HEREIN IS A PRODUCT EXPLANATORY MANUAL.

602

■SIGNATURE INFORMATION
| | |
|---|---|
| VERSION | V3 |
| SERIAL NUMBER | 01 |
| SIGNATURE ALGORITHM | sha1RSA |
| ISSUER | admin@abc.co.jp |
| START OF VALIDITY PERIOD | JAN. 1, 2004 |
| END OF VALIDITY PERIOD | DEC. 31, 2020 |
| SUBJECT | ifax@abc.co.jp  MFP Maker  RC-5000  A00011 |
| SIGNING ALGORITHM | sha1 |

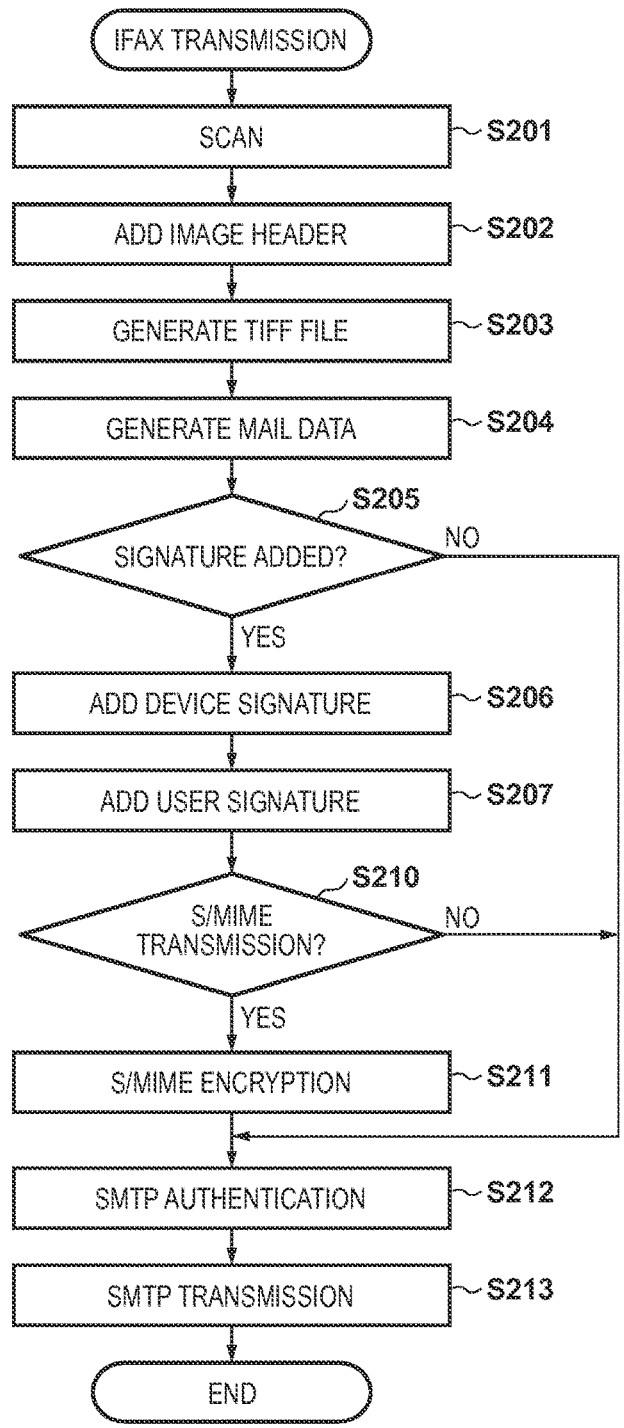

FIG. 11

600:
From: ifax@abc.co.jp
Sender :alice@abc.co.jp
To: ifax@xyz.co.jp
Subject: smime-mail
Date:Sat, 29 May 2010 13:21:23 +0900
Message-Id: <20100529132118.BED2.1342DF07@abc.co.jp>

601:
TO ZYZ INCORPORATED,

THANK YOU FOR YOUR TROUBLE.
SENT HEREIN IS A PRODUCT EXPLANATORY MANUAL.

602:
■SIGNATURE INFORMATION
| | |
|---|---|
| VERSION | V3 |
| SERIAL NUMBER | 01 |
| SIGNATURE ALGORITHM | sha1RSA |
| ISSUER | admin@abc.co.jp |
| START OF VALIDITY PERIOD | JAN. 1, 2004 |
| END OF VALIDITY PERIOD | DEC. 31, 2020 |
| SUBJECT | ifax@abc.co.jp  MFP Maker  RC-5000  A00011 |
| SIGNING ALGORITHM | sha1 |

603:
■SIGNATURE INFORMATION
| | |
|---|---|
| VERSION | V3 |
| SERIAL NUMBER | 01 |
| SIGNATURE ALGORITHM | sha1RSA |
| ISSUER | admin@abc.co.jp |
| START OF VALIDITY PERIOD | JAN. 1, 2004 |
| END OF VALIDITY PERIOD | DEC. 31, 2020 |
| SUBJECT | alice@abc.co.jp |
| SIGNING ALGORITHM | sha1 |

COMMUNICATION APPARATUS, METHOD OF CONTROLLING THE SAME, AND STORAGE MEDIUM

BACKGROUND OF THE INVENTION

Field of the Invention

The present invention relates to a communication apparatus which transmits or receives an image that is read from an original document, a method of controlling the same and a computer-readable storage medium.

Description of the Related Art

There exists S/MIME (Secure/Multipurpose Internet Mail Extensions) defined by RFC 2311 as a technique for enhancing security of an electronic mail, and this enables realization of encryption of electronic mail data. An Internet facsimile apparatus (IFAX) that performs communication of an image that is read in by a scanner and attached to an electronic mail also is widely used. In Japanese Patent Laid-Open No. 2004-297767 there is proposed an apparatus that comprises an electronic mail transmission mode and an IFAX mode. Also, in Japanese Patent Laid-Open No. 2007-26173 there is proposed a technique for adding a signature of multiple people in charge of one document as a technique which uses a digital signature. In Japanese Patent Laid-Open No. 2005-159726 there is proposed a technique for transmitting a certificate description item of an instructor of transmission as transmission source information when user authentication succeeds.

However, there is a problem with the above described conventional technique as is described below. For example, in an electronic mail mode, transmission using various file formats such as PDF, or the like, can be performed, and adding a signature is also possible, making it possible to identify who performed the transmission, and from what machine they performed the transmission. However, because the IFAX mode is limited to TIFF files, a signature, or the like, cannot be added. Therefore, there exists a problem in that in the case that a From address is falsified by a person with malicious intent, tracking is difficult, and the ability to suppress information leakage does not work. Also, there exists a problem in that in an IFAX mode, generally, mail data does not remain after transmitting an electronic mail using S/MIME, and since mail data is deleted if an attached file is printed, it is difficult for a user to confirm a digital signature.

SUMMARY OF THE INVENTION

The present invention enables realization of an arrangement for easily confirming a transmission source and signature data irrespective of a transmission mode, even in the case where a device includes an electronic mail mode and an IFAX mode, or the like.

One aspect of the present invention provides a communication apparatus having a first transmitting mode and a second transmitting mode for transmitting image data using an electronic mail, the apparatus comprising: a selecting unit configured to select the first transmitting mode or the second transmitting mode; and a controlling unit configured to control to transmit an electronic mail to which first signature information related to a user is added in a case where the first transmitting mode is selected by the selecting unit, and to transmit an electronic mail to which the first signature information and second signature information related to the communication apparatus are added in a case where the second transmitting mode is selected by the selecting unit.

Another aspect of the present invention provides a method of controlling a communication apparatus having a first transmitting mode and a second transmitting mode for transmitting image data using an electronic mail, the method comprising: selecting the first transmitting mode or the second transmitting mode; and controlling to transmit an electronic mail to which first signature information related to a user is added in a case where the first transmitting mode is selected by the selecting unit, and controlling to transmit an electronic mail to which the first signature information and second signature information related to the communication apparatus are added in a case where the second transmitting mode is selected by the selecting unit.

Still another aspect of the present invention provides a non-transitory computer-readable storage medium storing a computer program for causing a computer to function as the communication apparatus.

Further features of the present invention will be apparent from the following description of exemplary embodiments with reference to the attached drawings.

BRIEF DESCRIPTION OF THE DRAWINGS

FIG. 6 is a flowchart for generating a device signature according to the first embodiment.

FIG. 7 is a flowchart for describing an operation of an IFAX reception according to the first embodiment.

FIG. 8 is a view for explaining a mail body printed by the IFAX reception in a case where the user authentication is not performed on a side of the transmitter according to the first embodiment.

FIG. 9 is a flowchart for describing an operation of an IFAX transmission according to a second embodiment.

FIG. 11 is a view for explaining the mail body printed by the IFAX reception in a case where the user authentication is performed on a side of the transmitter according to the second embodiment.

DESCRIPTION OF THE EMBODIMENTS

Figure 1:
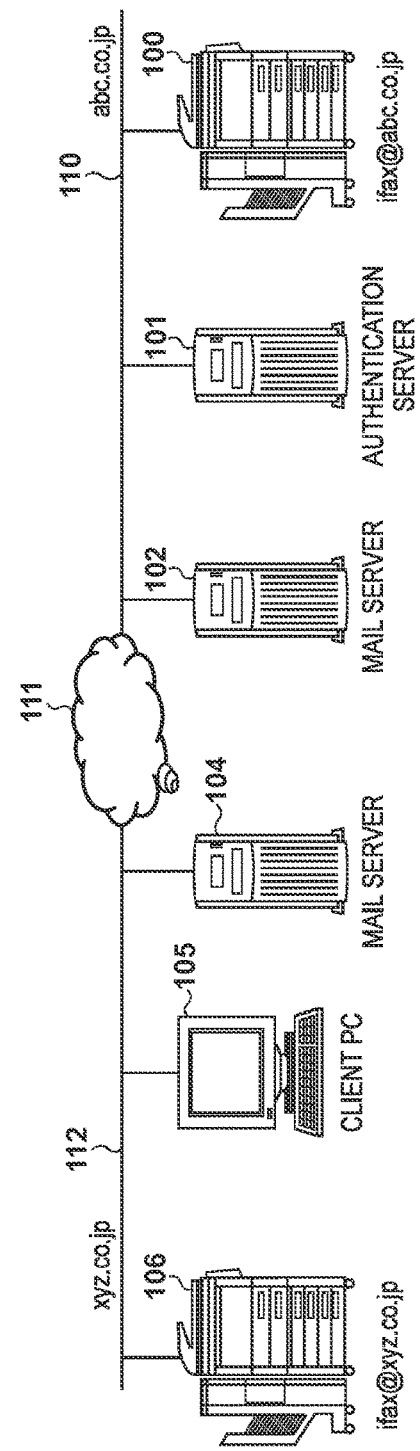
FIG. 1 is a view for illustrating a system configuration according to a first embodiment.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<First Embodiment>
<Configuration of Image Communication System>

Below, explanation will be given for the first embodiment of the present invention with reference to FIG. 1 through FIG. 9. Firstly, an explanation will be given for a configuration of an image communication system according to the present embodiment with reference to FIG. 1.

An MFP 100 (Multi Function Peripheral) is an image communication apparatus (a communication apparatus) comprising a copy function that employs an electrophotographic method, a FAX function, a printer function, or the like, and the MFP 100 is connected to a network line. In addition, the MFP 100 comprises a SEND function for transmitting an image file (image data) read from an original by a scanner to another computer device, and an IFAX function for receiving an image file read from an original by a device of the same type and printing based on the received image file. On a network 110, a domain name abc.co.jp is given, and an authentication server 101 and a mail server 102 are also connected to the network 110.

The authentication server 101 is comprised of a server such as Active Directory for managing, as its own domain, devices connected to the network 110, and an IC card authentication server. The mail server 102 performs communication with the MFP 100 using an SMTP or POP3 protocol, and it can distribute mail data to which an image file is attached. The network 110 is connected to the Internet 111, and is thus connected to a global network.

A mail server 104 and a client PC 105 are connected to a network 112, and the domain name xyz.co.jp is given, and the network 112 is also connected to the Internet 111. The mail server 104 is a mail server for processing an SMTP or a POP3 protocol, and it can communicate with the mail server 102 using SMTP via the Internet 111. An MFP 106 is an image processing apparatus comprising a copy, a FAX, and a printer function, similar to the MFP 100. Software of an image viewer is installed on the client PC 105, and it is possible to display an image scanned by the MFP 106, and the image can be printed by the MFP 106 using a printer function. Software of an electronic mail client is installed on the client PC 105, and it is possible to perform transmission/reception of an electronic mail in cooperation with the mail server 104.

<Configuration of Image Communication Apparatus>

Figure 2:
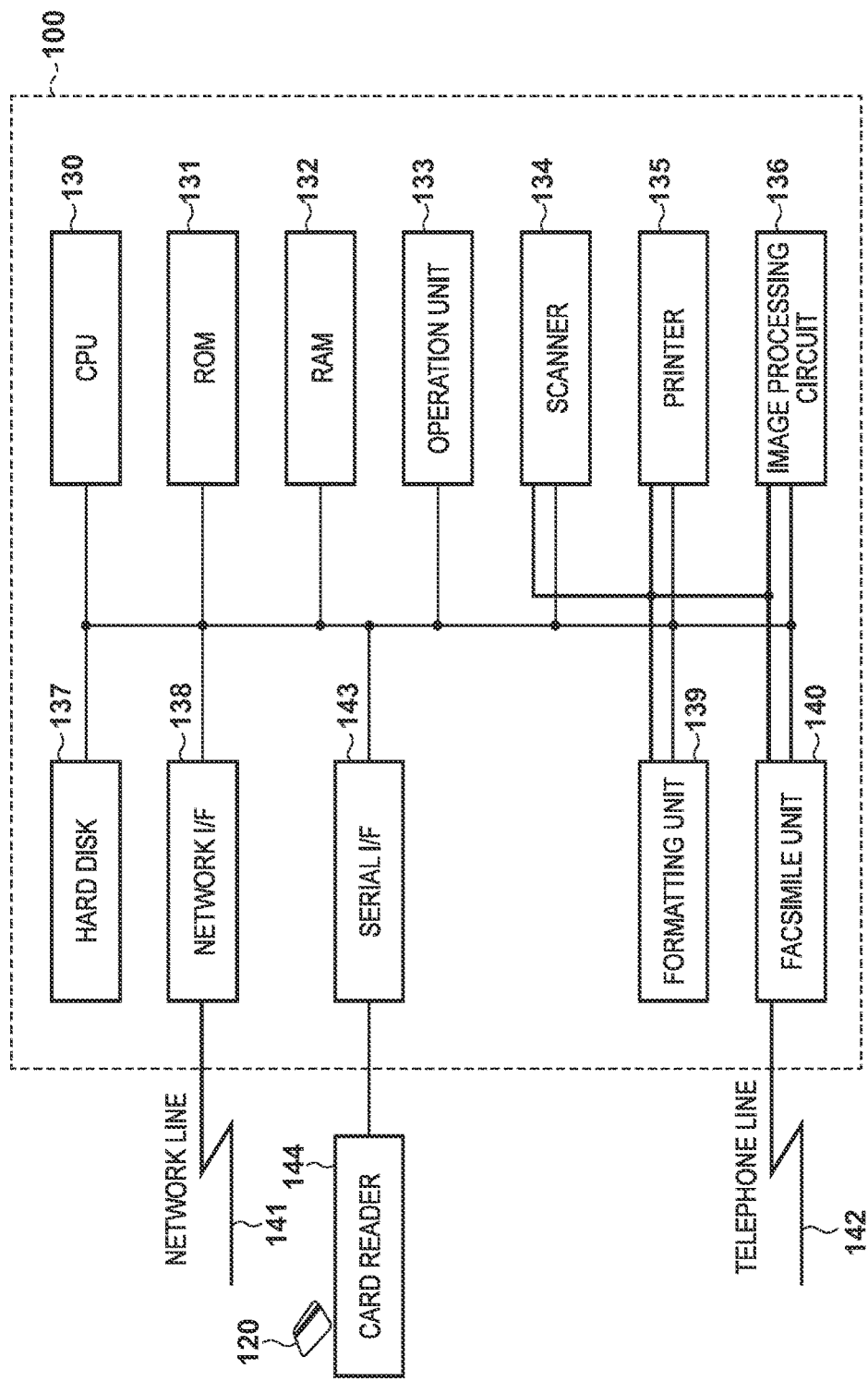
FIG. 2 is a view for showing an electrical configuration of an MFP according to a first embodiment.

Next, an explanation will be given for a configuration of the MFP 100 functioning as the image communication apparatus with reference to FIG. 2. Note that an explanation will be omitted for the MFP 106 because it has the same configuration as the MFP 100.

The MFP 100 comprises a CPU 130, a ROM 131, a RAM 132, an operation unit 133, a scanner 134, a printer 135, an image processing circuit 136, a hard disk 137, a network I/F 138, a serial I/F 143, a formatting unit 139, and a facsimile unit 140. The CPU 130 is a control circuit for performing control of the entire system using programs stored in the ROM 131 and a memory of the RAM 132.

The operation unit 133 is comprised of an LCD display panel and hardware keys such as a start key or a numeric keypad, and is a circuit for displaying a button realized by software on the LCD, detecting that a user touches the button with their finger, and executing a user operation smoothly. The scanner 134 functions as a reading unit, and generates image data by reading an image on an original. The printer 135 prints on a recording medium an image based on the image data. The image processing circuit 136 is comprised of a large capacity image memory, an image rotation circuit, a resolution resizing circuit, and an encode/decode circuit such as one for MH, MR, MMR, JBIG, JPEG, or the like, and the image processing circuit 136 can also execute various types of image processing such as shading, trimming, and masking.

The hard disk 137 is a mass storage medium connected by an I/F such as SCSI or IDE. The network I/F 138 is a circuit for connecting to a network line 141 such as Ethernet (registered trademark) represented by 10BASE-T and 100BASE-T, or token ring. The formatting unit 139 is a rendering circuit for generating an image printed by the printer 135.

In a case where PDL (Page Description Language) data from the PC is received through the network I/F 138, the image data is generated from the received PDL data. Then, the image processing is performed on the generated image data in the image processing circuit 136 and the generated image data is printed by the printer 135. Configuration is taken such that the scanner 134, the printer 135, the image processing circuit 136, and the formatting unit 139 are connected using a high speed video bus that is different from the CPU bus from the CPU 130, such that it is possible to transfer the image data at high speed.

The copy function is realized by the MFP 100 performing the image processing on the image data read by the scanner 134 by the image processing circuit 136, and operating such that the image read by the printer 135 is printed.

The facsimile unit 140 controls a facsimile communication with an external apparatus on a telephone line 142. In other words, image processing is performed by the image processing circuit 136 on the image data read from an original by the scanner 134, and transmitted to an external apparatus via the telephone line 142, data is received from an external apparatus, image processing is performed on the image processing circuit 136, and printing is performed by the printer 135. The image processing circuit 136 generates an image such as a JPEG, a PDF, or a TIFF from image data read from an original by the scanner 134.

The generated PDF image is transmitted by a communication protocol such as SMTP, FTP, or SMB from the network I/F 138 by the SEND function. The SEND function corresponds to file transmissions, electronic mail transmissions, Internet facsimile (IFAX) transmissions, and fax transmissions. A function for transmitting an image file such as a JPEG, a PDF, or a TIFF by the SMTP protocol is referred to as an electronic mail transmission. A function for transmitting by FTP, SMB, or WebDAV is referred to as a file transmission.

The IFAX transmission realizes a facsimile function by transmitting/receiving of image files attached to an electronic mail with the same type of the device as defined in the RFC 2305. In the IFAX transmission, by the image processing circuit 136, a TIFF file as defined in RFC 3949 is generated from the image data read by the scanner 134, and transmitted by the SMTP protocol. The TIFF file of the electronic mail is received using an SMTP or POP3 function, and after converting the format of the file to an image of an internal image format by the image processing circuit 136, printing is performed by the printer 135. In the fax transmission, the telephone line 142 is connected using the facsimile unit 140, and a G3 FAX transmission is performed.

The serial I/F 143 is a serial I/F such as an RSC 232, and is an I/F for connecting an external serial device to the MFP 100. A card reader 144 is connected to the serial I/F 143, and it is possible to read information recorded in a card 120. The card 120 is distributed to each user who uses the MFP 100, and a card ID recorded in the card is read by the card reader 144. By transmitting the card ID to the authentication server 101, identification of the user of the card is performed, user authentication is performed collaborating with a server such as Active Directory, and once authentication succeeds, the MFP 100 becomes usable. In a case where a mail address of the user, information of a HOME directory, or the like, are registered in the authentication server 101, the mail address and HOME directory information of a user who succeeds in the authentication for the MFP 100 can be obtained.

<IFAX Transmission Operation>

Figure 3:
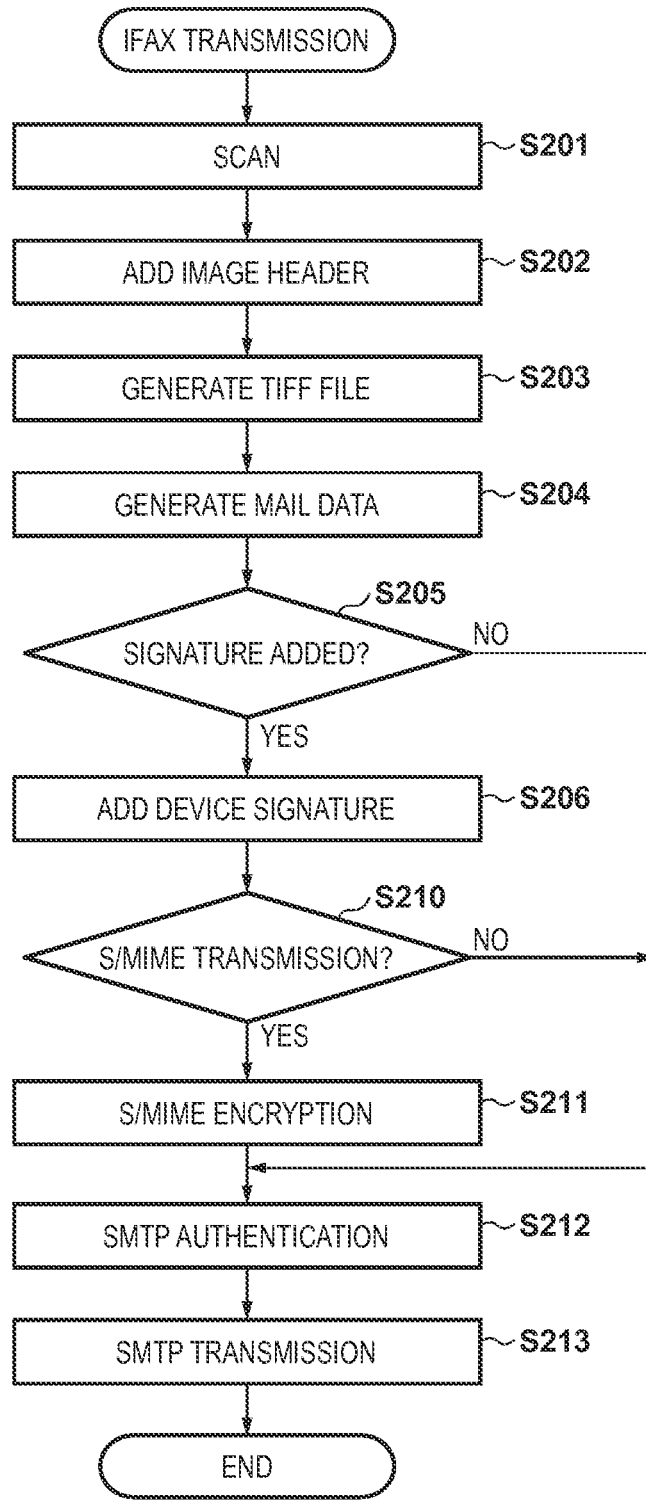
FIG. 3 is a flowchart of an IFAX transmission using S/MIME in a case where a user authentication according to the first embodiment is not performed.

Next, with reference to FIG. 3, an explanation will be given for a processing procedure of an IFAX transmission operation (IFAX mode) in a case where user authentication is not performed, and the MFP 100 is installed in a state where anyone can use the MFP 100 freely. Processing described below is performed by the CPU 130 reading out to the RAM 132 and executing a control program stored in the ROM 131 in advance. When the user selects an IFAX transmission partner from an address book (not shown) via the operation unit 133, places the transmission original on the scanner 134, and operates the start key, the IFAX transmission flow is started.

In step S201, the CPU 130 causes the scanner 134 to read the original that was placed on it. Then, in step S202, the CPU 130 adds an image header to the read original. Details on the processing will be explained later using FIG. 4. In step S203, the CPU 130 compresses the image to which the image header is added, and generates a TIFF file that is defined by an RFC 2301. In step S204 the CPU 130 encodes an image in BASE64 to a mail header having To, From, or the like, attaches it to a mail, and generates mail data. Details with regards to the mail to be transmitted will be explained later using FIG. 5.

Next, in step S205, the CPU 130 determines whether or not a device setting is set to "add signature" upon transmission of the electronic mail. In the case that the setting is performed, the processing proceeds to step S206, the CPU 130 performs the device signature adding processing, and the processing proceeds to step S210. On the other hand, in the case it is not set, processing transitions to step S212 and processing for transmitting is performed without adding a device signature and without performing S/MIME encryption.

In step S210, the CPU 130 executes a determination related to a "Perform/Do not perform S/MIME transmission" upon the transmission of the electronic mail setting that exists in the device settings. In the case that "Perform" is set, the processing proceeds to step S211, the CPU 130 performs S/MIME encryption processing, and the processing proceeds to step S212. The S/MIME encryption processing of step S211 encrypts an entire mail using a different content encryption key for every mail, encrypts a content encryption key using a public key of the user who is the transmission destination, and attaches the generated encrypted content encryption key to the mail. On the other hand, in the case that "do not perform" is set, the processing proceeds to step S212 without performing S/MIME encryption.

In step S212, the CPU 130 performs authentication with an SMTP server using "a user name upon SMTP authentication" and "a password upon SMTP authentication" which are registered in setting information of the device. Once authentication is successful, in step S213, the CPU 130 transmits electronic mail data according to the SMTP protocol, and ends the processing. Additionally, a user name used in SMTP authentication, the result, and To, From, Message-Id etc information of an electronic mail recorded in a log of the mail server 102 and a system administrator can be investigated later.

<Image Header>

Figure 4:
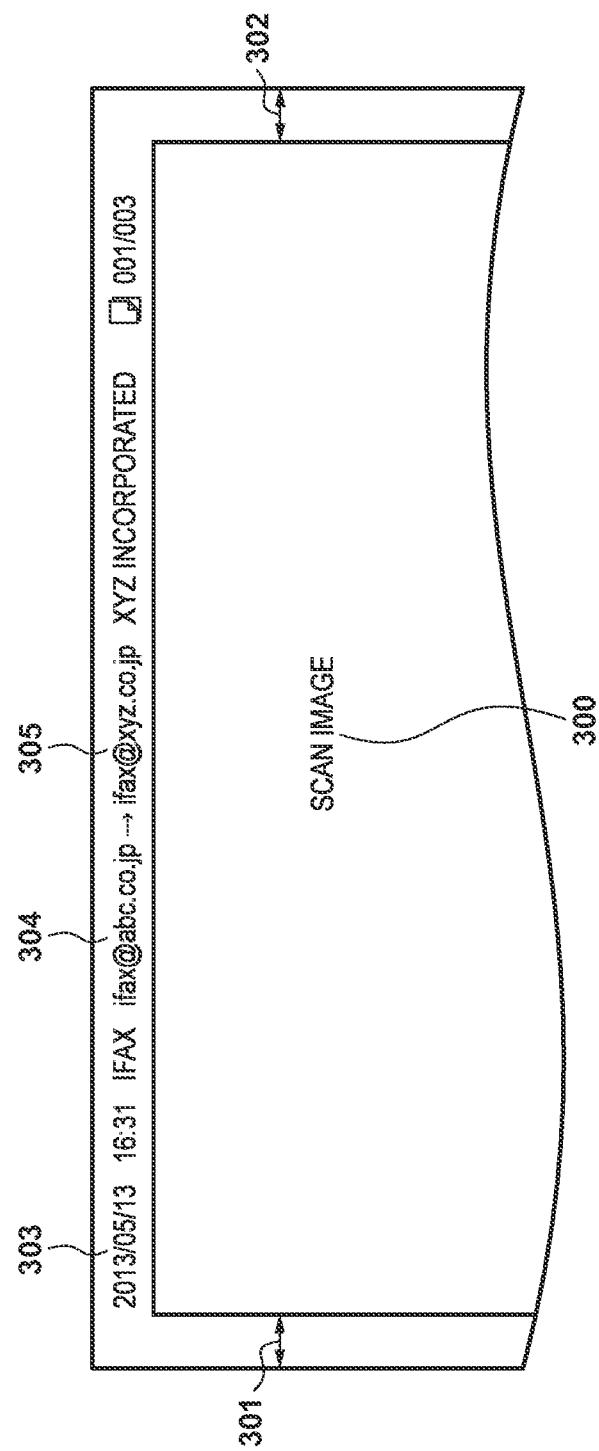
FIG. 4 is a view for explaining an image header of the IFAX transmission according to the first embodiment.

Next, with reference to FIG. 4, an explanation will be given for an image header that is added to an original document which is read in by the scanner 134 during an IFAX transmission. Reference numeral 300 shows an image that is read in by the scanner 134, and in the case that the image that is read at A4 and 200×200 dpi settings, a number of pixels of the main scanning direction is 1651 pixels. In the RFC 2301, since there exists a stipulation that the number of pixels for A4 200×200 dpi is 1728 pixels, laterally 38 pixels (reference numeral 301) and 39 pixels (reference numeral 302) are added to the image.

Additionally, as a header, an upper part of the image describes a time and transmission date, and a device mail address 304 (ifax@abc.co.jp) of the transmission source that is set for a From address of the electronic mail. Additionally, a device mail address 305 (ifax@xyz.co.jp) of a transmission destination that is set, a destination address abbreviation (XYZ incorporated), and a page number are described in a To address of the electronic mail.

For an IFAX, there are many cases where data is deleted if image data is printed when it is received without leaving data of the mail. However, if an image to which an image header is added at the transmitter is sent using S/MIME, and printing can be performed normally by the receiver, it can be proved if falsification of data occurred along the way, and the printed header image can be trusted.

<Electronic Mail Data>

Next, an explanation will be given for electronic mail data that is sent by an IFAX transmission with reference to FIG. 5. A device mail address (ifax@abc.co.jp) that is registered to a device setting of the MFP 100, which is the transmitter, is set to a From field 350. This address matches an electronic mail address of reference numeral 304 that was explained in FIG. 4. A device mail address (ifax@xyz.co.jp) that is a device mail address of the MFP 106 that is a receiver is set to a To field 351. This address matches an electronic mail address of reference numeral 305 that was explained in FIG. 4.

Data of reference numeral 360 is data into which data of reference numeral 370 is BASE64 encoded. Data of reference numeral 370 is comprised of recipient information 371, encrypted text 372, and data of a device signature 373. The recipient information 371 includes data into which a content encryption key, which changes with each mail, is encrypted by a public key of the recipient. The recipient who receives this mail decodes the content encryption key using their own private key. The encrypted text 372 is data into which mail data which includes an attached file is encrypted by the content encryption key, and the recipient decodes this using the decoded content encryption key. The device signature (device information) 373 is signature data in which device-specific data of the MFP 100 which will be explained later using FIG. 6 is described, and a digest of data before the encrypted text 372 is encrypted, a public key and signature data is encrypted using a private key of the device. The recipient decodes the encrypted text 372, creates a digest, and generates signature data. Verification of a validity period for data of the device signature 373, verification of whether or not a certificate chain is normal, and verification that expiration has not occurred is performed, and a public key is retrieved. The encrypted signature data of the device signature 373 is decoded using the public key and verification of whether or not it matches the signature data described above is performed. Also, verification of whether or not the From field 350 of the electronic mail (ifax@abc.co.jp) matches the mail address of SubjectAltName described in the device signature is performed.

<Generation of Device Signature>

Next, referring to FIG. 6, an explanation will be given for a processing procedure for generating a device signature that is performed on the MFP 100 before the transmission of the electronic mail explained in FIG. 5. Processing explained below is performed by the CPU 130 reading out to the RAM 132 and executing a control program stored in the ROM 131 in advance. When a device signature generation button is operated, the processing is started.

In step S401 the CPU 130 sets a manufacturer name for the manufacturer of the MFP 100 inside the device signature, in step S402 the CPU 130 sets a model name of the MFP 100, and in step S403 the CPU 130 records in the signature a body number that is a manufacturing number of the MFP 100. Therefore, if the signature is inspected, it is possible to identify which machine it was transmitted from.

In step S404, the CPU 130 determines whether or not a mail address of a device is registered to a device setting. In the case that it is not registered, the processing proceeds to step S405 and the CPU 130 displays an error message and completes the processing. On the other hand, in the case that it is registered, the processing proceeds to step S406, and the CPU 130 sets the mail address (ifax@abc.co.jp) of the device to a SubjectAltName field of the electronic signature.

Next, in step S407, the CPU 130 determines whether or not a mail address of the administrator is registered to a device setting. In the case that it is registered, the processing proceeds to step S408, and the CPU 130 sets an issuerAltName field to the administrator mail address and ends the processing. On the other hand, in the case that the mail address of the administrator is not registered, the processing proceeds to step S409 and the CPU 130 sets the issuerAltName field to the device mail address (ifax@abc.co.jp) and finishes.

<IFAX Reception>

Figure 5:
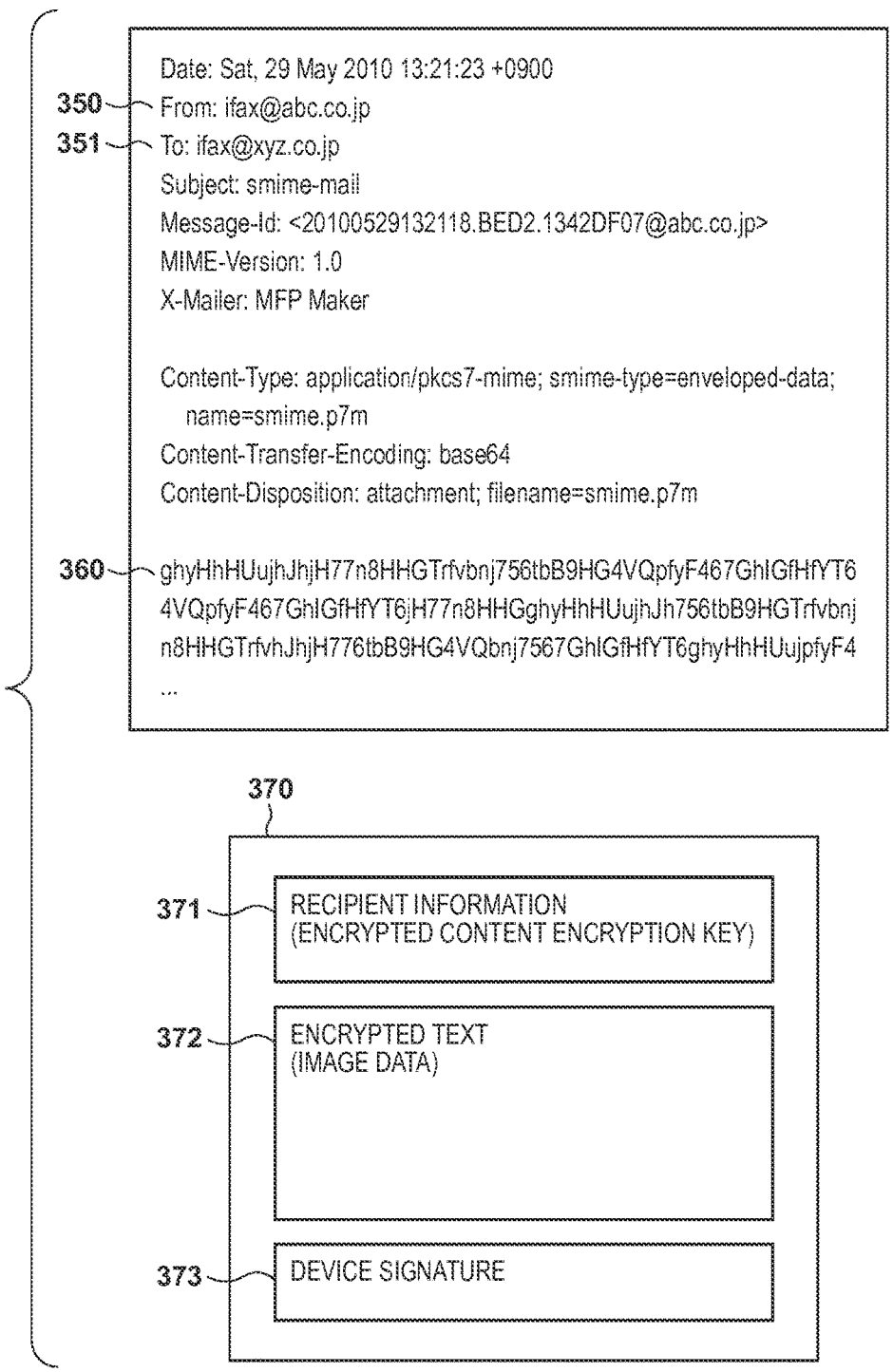
FIG. 5 is a view for explaining data of the IFAX transmission using S/MIME in a case where a user authentication according to the first embodiment is not performed.

Next is a flowchart, with reference to FIG. 7, of an IFAX reception that processes the mail data in FIG. 5 which is received using an SMTP or POP3 protocol. Processing explained below is performed by the CPU 130 reading out to the RAM 132 and executing a control program stored in the ROM 131 in advance.

In step S501, the CPU 130 analyzes MIME data of the electronic mail. In step S502, the CPU 130 determines whether or not the MIME data in step S501 is for an S/MIME mail based on the result of analysis. In the case that it is an S/MIME mail, the processing proceeds to step S503, the CPU 130 performs S/MIME decryption, and the processing proceeds to step S504. On the other hand, in the case that it is not an S/MIME mail, the processing proceeds to step S504 without performing the decryption.

In step S504, the CPU 130 extracts a mail body from the mail data, and generates mail body data. Continuing on, in step S505, the CPU 130 BASE64 decodes a part of an attached file of mail data, generates a multi-page TIFF file, decodes image data having divided it by page, and changes the image format to one for which high speed processing is possible within the MFP 100.

Next, in step S506, the CPU 130 determines whether or not a signature is added to the electronic mail based on a mail analysis result. In the case that there is a signature added, the processing proceeds to step S507, and the CPU 130 performs verification of the signature. Continuing on, in step S508, the CPU 130 extracts data from signature data, assigns the extracted data to the mail body, and the processing proceeds to step S509. By assigning to the mail body (embedding) the signature data and the mail body cannot become separated, and therefore these cease to be printed as a separate page, suppressing the number of printing sheets. On the other hand, in the case that it is determined that an electronic signature is not added in step S506, the processing proceeds to step S509 without verifying the signature. In step S509, the CPU 130 performs processing for printing an attached file and a mail body, and only prints the attached TIFF file in the case where the mail body does not exist, and then completes the processing.

<Print Result>

Next, an explanation will be given for a printed material of the mail body that was explained in FIG. 7 with reference to FIG. 8. Reference numeral 600 denotes data extracted for important ID fields of To, From, Sender, Subject, Date, and Message from the MIME data of a mail.

A portion of reference numeral 601 is data of the mail body that is input by a sender using the operation unit 133. A portion of reference numeral 602 is the portion for which the signature data was assigned to the mail body in step S508, and the device signature data that was explained using FIG. 6 is described. Data of a version, a serial number, a signature algorithm, an issuer, a validity period, a subject, and a signing algorithm are described. In the issuer field, a mail address of the administrator registered in step S408 is set, and in the subject are set the manufacturer name, the model name, the body number, and the mail address of the device from step S401-step S403 and step S406.

As explained above, the image communication apparatus on the transmitting side adds the image header that includes the transmission source information to image data that is read from an original document in the case that the original document is read from an image and an IFAX mode is selected. Additionally, mail data of a file format that corresponds to the IFAX mode is generated using the image data to which the image header is added, and an electronic mail is transmitted in the IFAX mode in accordance with the generated mail data. On the other hand, in a case that mail body data is extracted from the mail data of the electronic mail, and a signature is added to the electronic mail, the image communication apparatus on the receiving side embeds a signature in the extracted mail body data and prints the mail body and the attached file that is attached to the electronic mail.

Generally, the IFAX does not leave mail data, but rather deletes it, and therefore it is difficult for a user to confirm data of an electronic signature; however it is possible for the user to confirm the signature by including the signature information in the mail body as in the present embodiment. More specifically, in the present invention, when performing an IFAX transmission using S/MIME, by adding a certificate in which a body number which identifies the transmitter is described, it is possible to identify from which machine a transmission was performed. Also, upon receiving data to which signature data is added for a receiver, since control is performed so as to print the destination address information of the mail header and the signature data, it is possible to confirm that the address information of the mail header is not falsified at the receiver.

For example, since a user can confirm if a mail address (ifax@abc.co.jp) of a device and a From address (ifax@abc.co.jp) that are described in the signature match, it is possible to confirm that the From address is not falsified. Also, in the case of transferring this received data, it is possible to confirm that an IFAX reception/transferred destination address for transferring the mail data and that the original text are information that can be trusted. The same effect can be obtained by transferring a rasterized image for printing a mail body, to a destination address to which text data cannot be sent, such as with FAX. Additionally, a mail address of the device of the printed device signature also matches the address of reference numeral 304, which is added to the image header.

<Second Embodiment>

Figure 10:
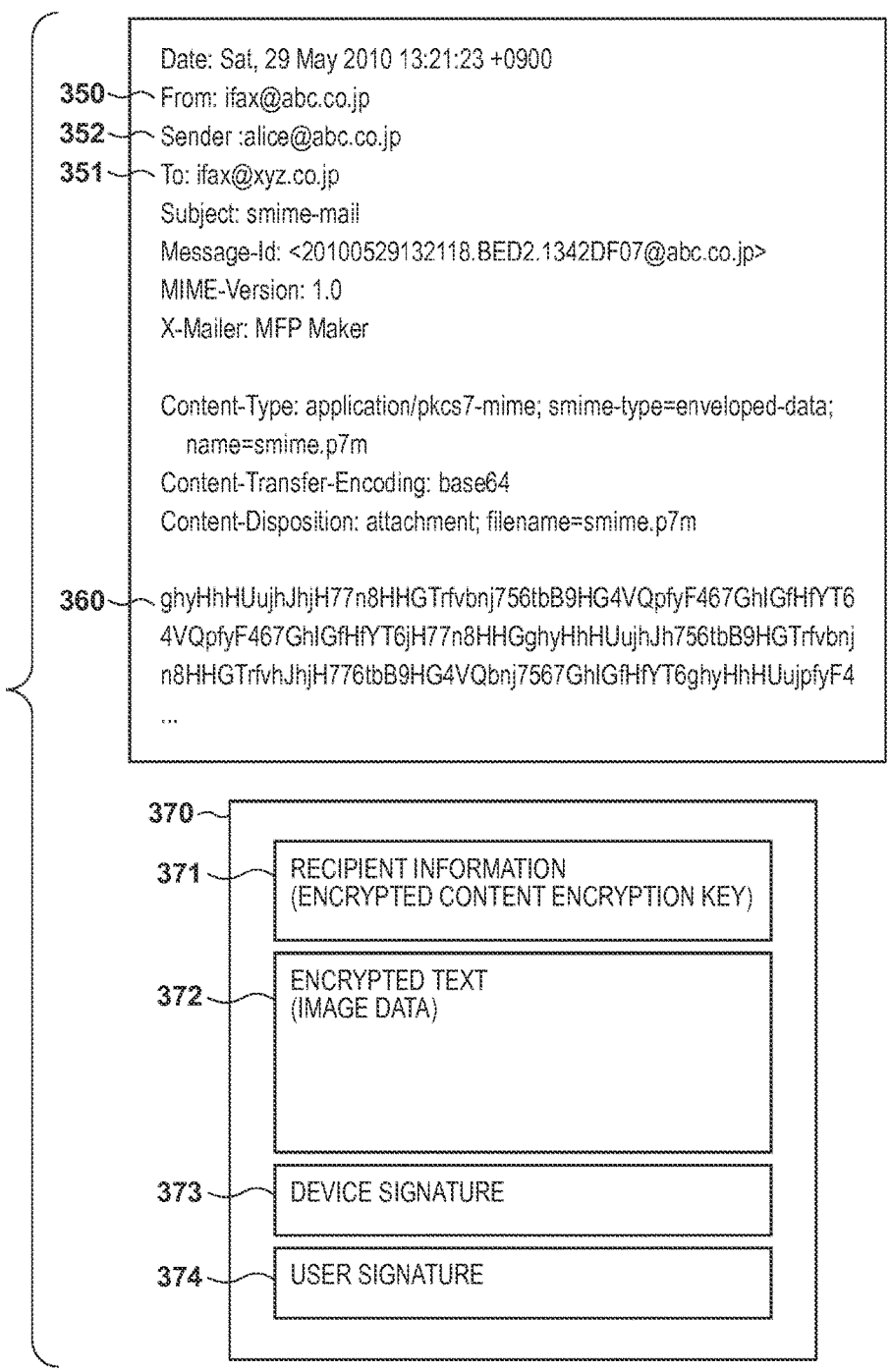
FIG. 10 is a view for explaining data of the IFAX transmission using S/MIME in a case where the user authentication according to the second embodiment is performed.

Below, an explanation will be given for the second embodiment of the present invention with reference to FIG. 9 through FIG. 11. First, with reference to FIG. 9, an explanation will be given for a processing procedure of an IFAX transmission operation in a case in which authentication is performed upon a user logging in, and a mail address of the user can be obtained from the authentication server 101. Processing described below is performed by the CPU 130 reading out to the RAM 132 and executing a control program stored in the ROM 131 in advance. When the card 120 that is managed by each individual person is held up to the card reader 144, a card ID is read in, and transmitted to the authentication server 101. The authentication server 101 performs identification of the user of the card, and collaborates with a server such as an Active Directory to perform the authentication of the user; if authentication succeeds, the MFP 100 becomes usable. Also, if authentication succeeds then a mail address of the authenticated user can be obtained from the authentication server 101. When the user selects an IFAX transmission partner from an address book (not shown) via the operation unit 133, places the transmission original on the scanner 134, and operates the start key, the following IFAX transmission flow is started.

Note that only an explanation of portions different from the above described first embodiment will be given below. Here, only an explanation of the processing in step S207 will be given; the same step numbers will be given for the processing that is the same as in FIG. 2, and explanation of these is omitted. In step S207, the CPU 130 adds to the mail data a user signature of the authenticated user, for which information that identifies the user, such as a name or a mail address of the authenticated user is registered, that is issued by a certification station registered for the MFP 100 in advance.

<Electronic Mail Data>

Next, with reference to FIG. 10, an explanation will be given for electronic mail data that is transmitted by the IFAX transmission in a case that user authentication is performed as explained using FIG. 9. A device mail address (ifax@abc.co.jp) of the MFP 100 that is the transmitter is set in the From field 350, and this address matches the device mail address of reference numeral 304 that is explained in FIG. 4.

A mail address of an authenticated user who logged in is registered to a Sender field 352. In the present embodiment, since a user named alice logs in, a mail address of alice@abc.co.jp is used, and this address is set to reference numeral 352. A device mail address (ifax@xyz.co.jp) of the MFP 106 that is the receiver is set in the To field 351, and this address matches the electronic mail address of reference numeral 305 that is explained in FIG. 4.

Data of 360 is data into which data of 370 that is BASE64 encoded. Data of reference numeral 370 is comprised of data of the recipient information 371, the encrypted text 372, the device signature 373, and a user signature 374. The recipient information 371 includes data into which a content encryption key, which changes with each mail, is encrypted by a public key of the recipient. The recipient who receives this mail decodes the content encryption key using their own private key. The encrypted text 372 is data into which mail data which includes an attached file is encrypted by the content encryption key, and the recipient decodes this using the decoded content encryption key. The device signature 373 is signature data in which device-specific data of the MFP 100 which will be explained later using FIG. 6 is described, and a digest of data before the encrypted text 372 is encrypted, a public key and signature data is encrypted using a private key of the device. The recipient decodes the encrypted text 372, creates a digest, and generates signature data.

Verification of the validity period for data of the device signature 373, verification of whether or not a certificate chain is normal, and verification that expiration has not occurred are performed, and a public key is retrieved. The encrypted signature data of the device signature 373 is decoded using the public key and verification of whether or not it matches the signature data described above is performed. Also, verification as to whether or not a mail address that is described in a device signature matches a From address (ifax@abc.co.jp) of an electronic mail is performed.

The user signature 374 is signature data of the user alice, and is issued by a certification authority, and the mail address of alice (alice@abc.co.jp) is described in the SubjectAltName. Verification of the digital signature is performed using the same method as for the device signature, and verification as to whether or not a Sender field (alice@abc.co.jp) of an electronic mail and a mail address (alice@abc.co.jp) of the SubjectAltName of the user signature 374 match is also performed.

<Print Result>

Next, an explanation will be given for a printed material of the mail body that was explained in FIG. 10 with reference to FIG. 11. Reference numeral 600 denotes data extracted for important ID fields of To, From, Sender, Subject, Date, and Message from the MIME data of a mail.

A portion of reference numeral 601 is data of the mail body that is input by a sender using the operation unit 133. A portion of reference numeral 602 is the portion for which the signature data was assigned to the mail body in step S508, and the device signature data that was explained using FIG. 6 is described. Data of a version, a serial number, a signature algorithm, an issuer, a validity period, a subject, and a signing algorithm are described. In the issuer field, a mail address of the administrator registered in step S408 is set, and in the subject are set the manufacturer name, the model name, the body number, and the mail address of the device from step S401-step S403 and step S406. For this reason, since the mail address of the device (ifax@abc.co.jp) is described in the subject field, it can be seen that the From data is correct and not falsified.

Reference numeral 603 is a user signature of alice, and similarly too that of the device signature, data of a version, a serial number, a signature algorithm, an issuer, a validity period, a subject, and a signing algorithm are described. Since a mail address of alice (alice@abc.co.jp) is described in a subject field, it can be seen that the Sender field data is correct and not falsified.

As explained above, generally, the IFAX does not leave mail data, but rather deletes it, and therefore it is difficult for a user to confirm data of an electronic signature; however it is possible for the user to confirm the signature by including the signature information in the mail body. Also, in the case of transferring this received data, it is possible to confirm that a transferred destination address for transferring the mail data and the original text are information that are trustworthy. The same effect can be obtained by transferring a rasterized image for printing a mail body, to a destination address to which text data cannot be sent, such as with FAX.

<Third Embodiment>

Figure 12:
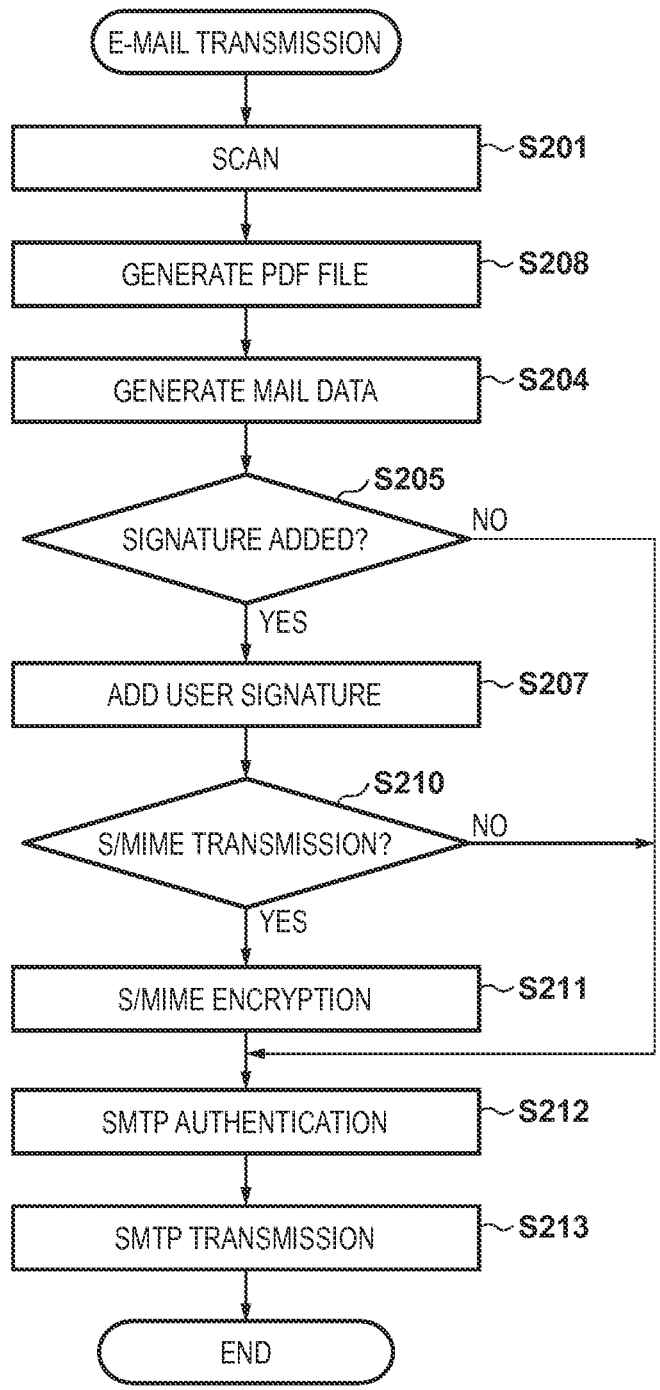
FIG. 12 is a flowchart for describing an electronic mail transmission operation in a case where a user authentication according to a third embodiment is performed.
Figure 13:
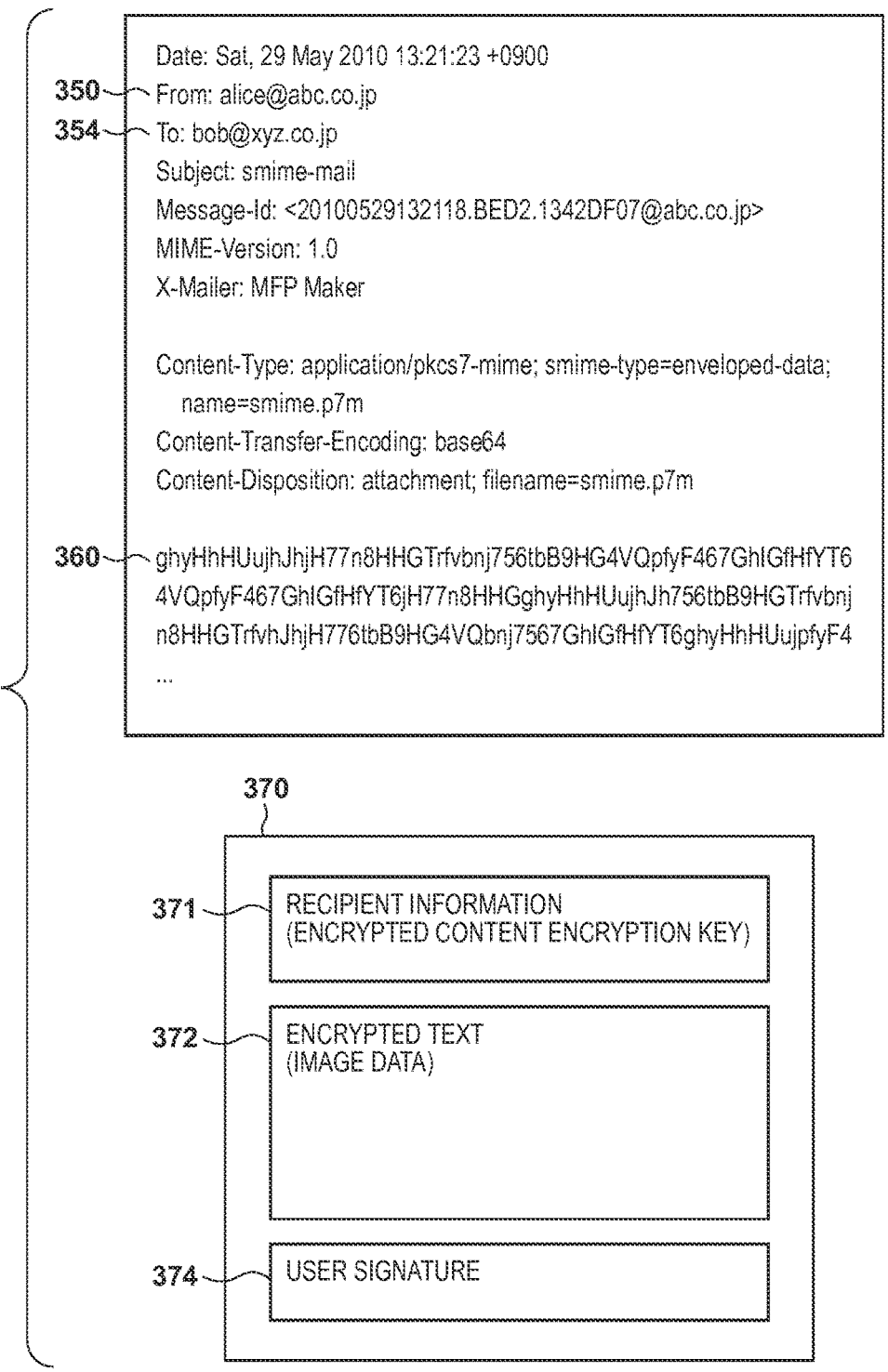
FIG. 13 is a view for explaining electronic mail transmission data in a case where the user authentication according to the third embodiment is performed.

Below, an explanation will be given for the third embodiment of the present invention with reference to FIG. 12 and FIG. 13. In the present embodiment, an explanation will be given for a method of allowing a user to confirm a signature for an Email transmission operation (an electronic mail mode) preferably. Additionally, a determination is made as to whether an operation is an electronic mail transmission operation or a FAX transmission operation, and it is advantageous to perform switching between executing the process explained according to the above first or second embodiment, and executing a later explained process explained in the present embodiment based on the result of the determination. First, with reference to FIG. 12, an explanation will be given for a processing procedure of an Email transmission operation in a case in which authentication is performed upon a user logging in, and a mail address of the user can be obtained from the authentication server 101. Processing described below is performed by the CPU 130 reading out to the RAM 132 and executing a control program stored in the ROM 131 in advance.

The IFAX transmission operates under the assumption of a transmission from one device to another device, however, Email transmission operates under the assumption of a transmission from a device to an electronic mail address of a PC. When the card 120 that is managed by an individual person is held up to the card reader 144, the card ID is read and transmitted to the authentication server 101. The authentication server 101 performs identification of the user of the card, and collaborates with a server such as an Active Directory to perform the authentication of the user; if authentication succeeds, the MFP 100 becomes usable. In this case, the mail address of the authenticated user can be obtained. In the present embodiment, since a user named alice logs in to the MFP 100, the mail address of the authenticated user (alice@abc.co.jp) is obtained from the authentication server 101. The user selects a transmission partner (bob@xyz.co.jp) for the electronic mail from an address book (not shown) through the operation unit 133, and places a transmission original on the scanner 134 then operates a start key to start the following electronic mail transmission flow.

Note that only an explanation of portions different from the above described first and second embodiments will be given below. Here, only an explanation of the processing in step S208 will be given; the same step numbers will be given for the processing that is the same as in FIG. 3 and FIG. 8, and explanation of these is omitted. In the IFAX transmission, a transmission pixel count and a transmission file format are limited to a TIFF file; however, since for an electronic mail transmission any file that a PC is able to handle may be used, in a default setting an image read by the scanner is transmitted as a PDF file.

In step S208, the CPU 130 generates a PDF file. The flowchart of FIG. 12 is different from the flowchart of FIG. 3 of the above explained first embodiment, and executes step S208 in place of the processing of step S202 and step S203, and is different also from the flowchart of FIG. 8 explained in the above explained second embodiment, and executes step S207 in place of step S206.

<Electronic Mail Data>

Next, with reference to FIG. 13, an explanation will be given for electronic mail data that is transmitted by the Email transmission in a case that user authentication is performed as explained using FIG. 12.

The electronic mail address of the login user (alice@abc.co.jp) is set to the From field 350. The mail address of bob who is the recipient (bob@xyz.co.jp) is set to the To field 354. Data of reference numeral 360 is data into which data of reference numeral 370 is BASE64 encoded. Data of reference numeral 370 is comprised of the recipient information 371, the encrypted text 372, and data of the user signature 374.

The recipient information 371 includes data into which a content encryption key, which changes with each mail, is encrypted by a public key of the recipient. Electronic mail client software that operates on the client PC 105 that receives this mail uses a private key that is set in advance by bob on the PC to decrypt the content encryption key. The encrypted text 372 is data into which mail data which includes an attached file is encrypted by the content encryption key, and the recipient decodes this using the decoded content encryption key.

The user signature 374 is signature data of the sender alice, and a digest of data before the encrypted text 372 is encrypted, a public key and signature data is encrypted by the private key of the device. The recipient decrypts the encrypted text 372, a digest is generated, and the signature data is generated. Verification of the validity period for data of the user signature 374, verification of whether or not a certificate chain is normal, and verification that expiration has not occurred is performed, and the public key is retrieved. The encrypted signature data of the user signature 374 is decrypted using the public key, and verification of whether or not it matches the signature data described above is performed.

Additionally, while an explanation was given for an electronic mail address of a user being obtained from the authentication server 101 when authentication succeeds, a configuration may be taken such that a mail address of an authenticated user is held inside the MFP 100, and then obtained. Also, an explanation was given using both a user authentication and an authentication server; however, the same effect can be obtained by registering a user inside the MFP 100 and performing user authentication.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-091997 filed on Apr. 25, 2014, which is hereby incorporated by reference herein in its entirety.

What is claimed is:

1. A control method for controlling a communication apparatus having an internet fax transmitting mode for transmitting image data of Tag Image File Format (TIFF) using electronic mail, the control method comprising the steps of:
    setting a first email address of the communication apparatus to a From field of a header of electronic mail data;
    setting a second email address of a login user who logs in to the communication apparatus to a Sender field of the header of the electronic mail data;
    generating a first electronic signature using the first email address set in the From field;
    generating a second electronic signature using the second email address set in the Sender field;
    adding to the electronic mail data including the image data of the TIFF, the first electronic signature and the second electronic signature; and
    transmitting, in the internet fax transmitting mode, the image data of the TIFF as the electronic mail data to which the first electronic signature and the second electronic signature are added.

2. The control method according to claim 1, further comprising the step of encrypting the image data to be transmitted using the electronic mail.

3. The control method according to claim 1, wherein the first electronic signature and the second electronic signature are added to a mail body of the electronic mail data.

4. The control method according to claim 1, wherein the electronic mail data to be transmitted includes data obtained by encrypting, using a public key of a destination apparatus, a content encryption key changing for each electronic mail.

5. The control method according to claim 4, wherein the electronic mail data to be transmitted includes data obtained by encrypting, using the content encryption key, the electronic mail data including an attached file.

6. The control method according to claim 1, wherein the first electric signature includes at least one of identification information for identifying a manufacturer, an apparatus name of the communication apparatus, a device number of the communication apparatus, and an email address of an administrator.

7. The control method according to claim 1, further comprising the steps of:
    generating image data by reading an image on an original; and
    in the internet fax transmitting mode, adding an image header including the email address of the communication apparatus and an email address of a destination apparatus to the generated image data, generating an image file based on the image data to which the image header is attached, and transmitting the electronic mail data to which the generated image file is attached.

8. The control method according to claim 1, wherein
    the communication apparatus includes another transmitting mode in which image data is transmitted using electronic mail, the another transmitting mode being different from the internet fax transmitting mode, and comprising the steps of:
    in a case where electronic mail data is transmitted in the other transmitting mode,
    setting the email address of the login user to the From field of the header of the electronic mail data;
    adding the second electronic signature to the electronic mail data without adding the first electronic signature to the electronic mail data; and
    transmitting the electronic mail data to which the second electronic signature is added.

9. A communication apparatus comprising:
    a communication interface configured to transmit image data of Tag Image File Format (TIFF) using electronic mail in an internet fax transmitting mode;
    one or more memories configured to store a set of instructions; and
    one or more processors configured to executes the instructions to:
    set a first email address of the communication apparatus to a From field of a header of electronic mail data;
    set a second email address of a login user who logs in to the communication apparatus to a Sender filed of the header of the electronic mail data;
    generate a first electronic signature using the first email address set in the From field;
    generate a second electronic signature using the second email address set in the sender field;
    add, to the electronic mail data including the image data of the TIFF, the first electronic signature and the second electronic signature; and
    transmit, in the internet fax transmitting mode, the image data of the TIFF as the electronic mail data to which the first electronic signature and the second electronic signature are added.

10. A non-transitory computer readable storage medium storing a computer program for performing a control method for controlling a communication apparatus having an internet fax transmitting mode for transmitting image data of Tag Image File Format (TIFF) using electronic mail, the control method comprising the steps of:
    setting a first email address of the communication apparatus to a From field of a header of electronic mail data;
    setting a second email address of a login user who logs in to the communication apparatus to a Sender field of the header of the electronic mail data;
    generating a first electronic signature using the first email address set in the From Field;
    generating a second electronic signature using the second email address set in the sender field;
    adding, to the electronic mail data including the image data of the TIFF, the first electronic signature and the second electronic signature; and
    transmitting, in the internet fax transmitting mode, the image data of the TIFF as the electronic mail data to which the first electronic signature and the second electronic signature are added.

* * * * *